United States Patent Office

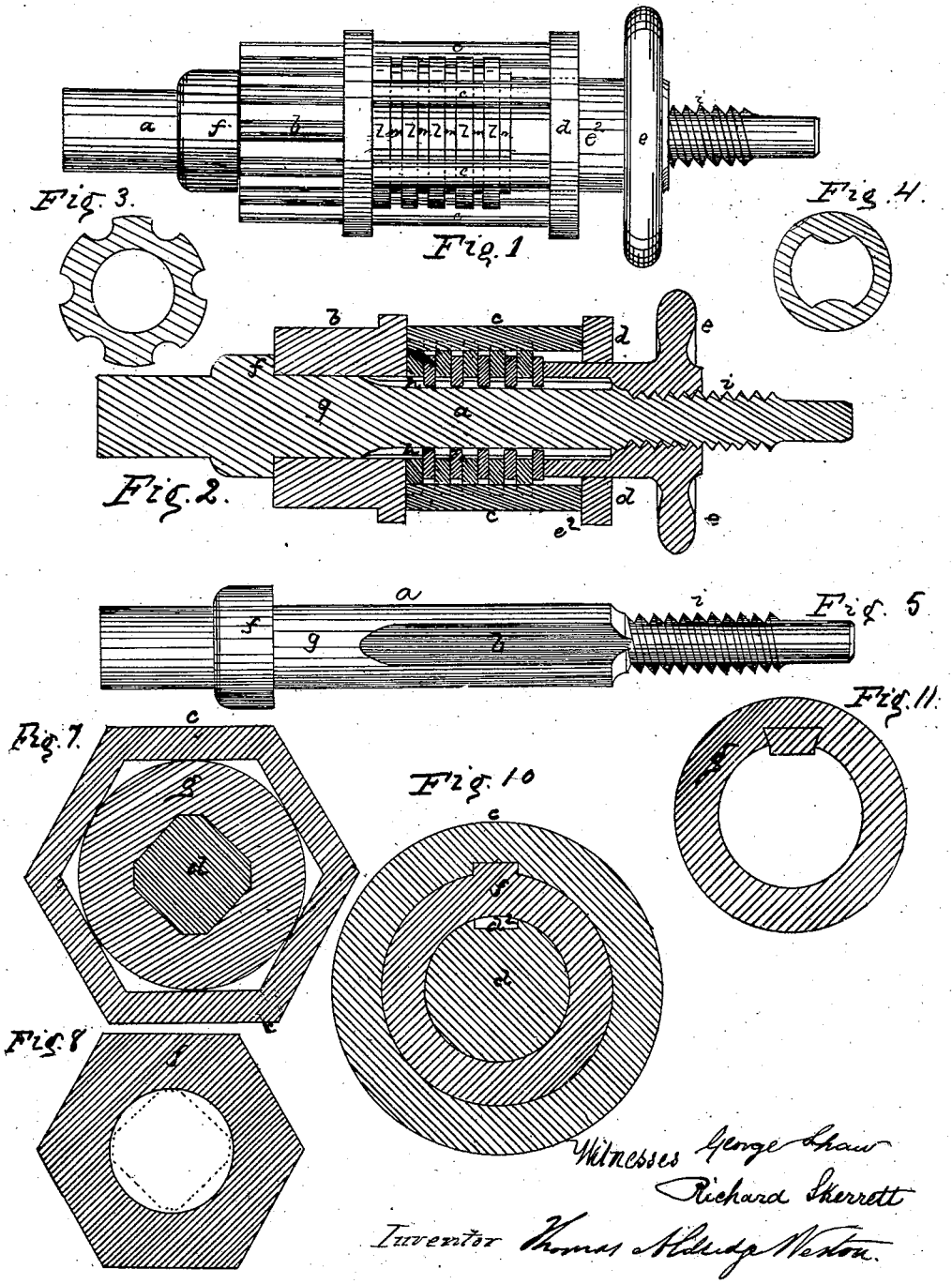

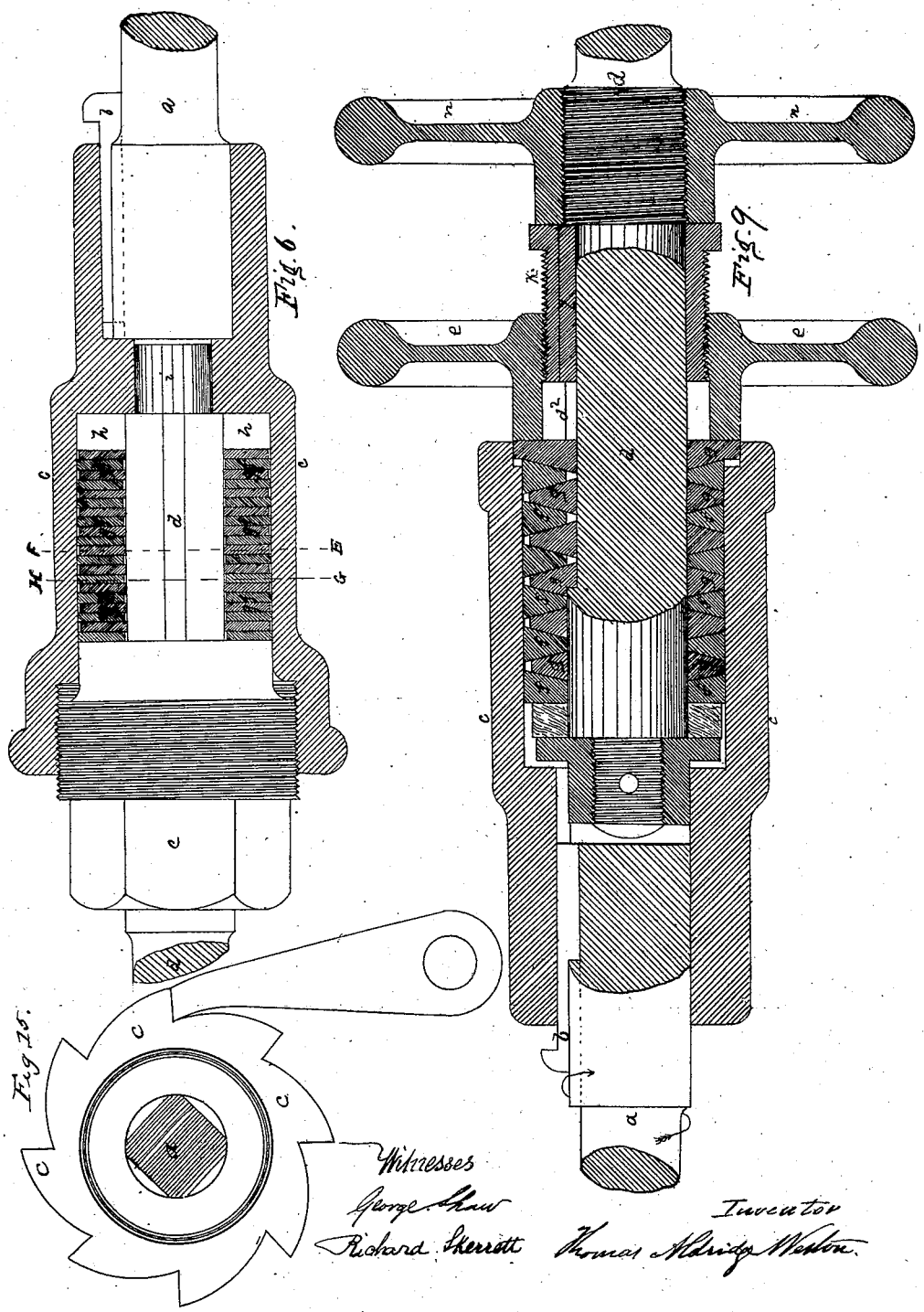

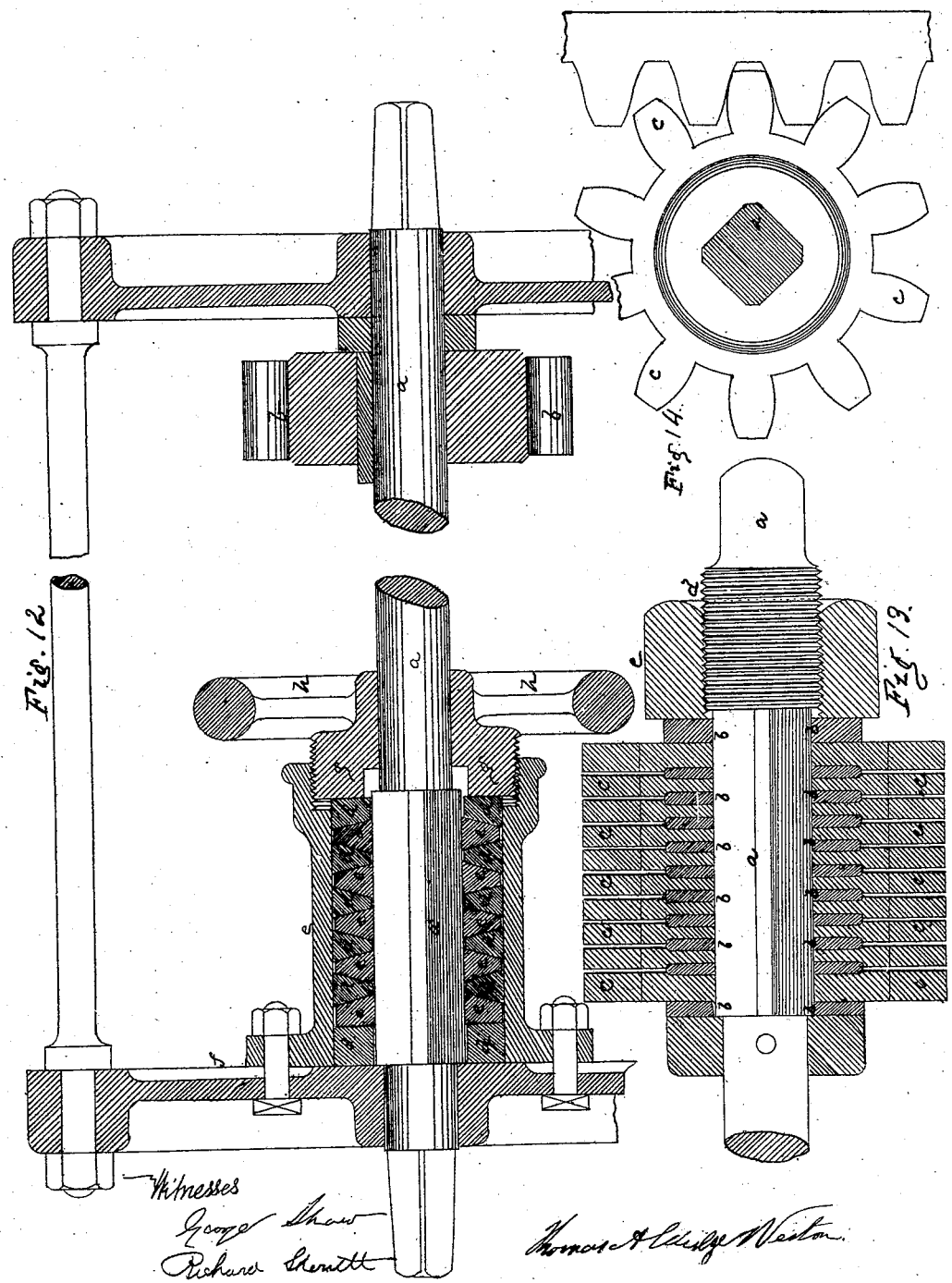

THOMAS ALDRIDGE WESTON, OF KING'S NORTON, ENGLAND.

Letters Patent No. 75,227, dated March 3, 1868.

IMPROVEMENT IN COUPLING AND BRAKE.

The Schedule referred to in these Letters Patent and making part of the same.

TO ALL TO WHOM IT MAY CONCERN:

Be it known that I, THOMAS ALDRIDGE WESTON, at present residing at King's Norton, in the county of Worcester, England, mechanical engineer, a citizen of the United States of America, have invented or discovered "A New or Improved Coupling and Brake for Transmitting, or Regulating, or Arresting Motion;" and I, the said THOMAS ALDRIDGE WESTON, do hereby declare the nature of the said invention, and in what manner the same is to be performed, to be particularly described and ascertained in and by the following statement thereof; that is to say—

My invention consists of the arrangement or combination of parts hereinafter described, and illustrated in the accompanying drawings, whereby two shafts, or other bodies, capable of rotary motion on a common axis or on axes in a line with each other, are so coupled together that rotary motion in the one may be transmitted to the other, or rotary motion in the one may be retarded or arrested by the other. My said invention consists essentially in the employment of two series of disks, which are connected respectively to the two shafts or bodies to be coupled together, or uncoupled from one another, the disks on one shaft or body alternating with those on the other shaft or body, and each series capable of sliding from or towards each other. When the alternating disks are not in contact, the two shafts or bodies can rotate independently of one another. If, however, the two series of disks are brought into contact, and pressed together, the friction between the two series of disks will, according to the number of disks employed, and the force with which they are pressed together, either retard or arrest any rotary motion which either may have. If the pressure be sufficiently great, the two sets of disks, and the shafts or bodies to which they are respectively connected, are coupled together, and the rotary motion of the one transmitted to the other.

In order that my invention may be better understood, I will proceed to describe, with reference to the accompanying drawings, the manner in which the same is to be performed.

Figures 1, 2, 3, 4, and 5, represent the simplest form of a coupling, constructed according to my invention, applied to the coupling and uncoupling of a shaft and pinion—

Figure 1 being a side elevation,

Figure 2 a longitudinal section, and

Figures 3, 4, and 5 are portions of the same.

$a$ is the shaft, and $b$ the pinion, which two parts are to be frictionally connected with each other with varying degrees of force suited to the machine or purpose to which the invention is applied. The said shaft $a$ (shown separately in fig. 5) has a collar at $f$, between which and the boss, $e^2$, of the hand-wheel $e$, the pressure is applied by the screwing of the said hand-wheel upon the screw $i$. The shaft $a$ is plain at $g$, in order that the pinion $b$ may turn freely thereon when the pressure is withdrawn. The pinion $b$ has firmly attached to it small bars or rods $c$, supported at their further ends in the ring $d$. Within this framing two series of disks, marked respectively $l\ m$, are situated. The shaft $a$ is fluted at $h$, or otherwise made to correspond with the central opening of the disks $m$. The said disks are thereby made to turn with the said shaft, but are also capable of sliding upon the shaft. The other disks $l$ are slotted at their edges (see fig. 3) to engage with the rods $c$. The said disks $l$ are thereby made to turn with the pinion-frame, and are also capable of sliding upon the shaft $a$. When no pressure is applied to the coupling, the pinion $b$ is wholly disconnected from the shaft $a$, and may turn independently of it, the said pinion carrying with it the attached rods $c$, ring $d$, and engaged disks $l$. Likewise, the shaft $a$ may turn independently of the pinion $b$ and parts connected with it, the said shaft $a$, in turning, carrying with it the disks $m$ and the hand-wheel fitted to the screw $i$.

The series of disks $l$ and the other series $m$ are placed alternately, as represented. Both series may slide lengthwise on the shaft $a$, as before explained, so that their sides may be in more or less intimate contact. The pressure of the hand-wheel $e$, when applied to the end disk, is transmitted through the whole double series to the pinion $b$, and the said pinion pressed forcibly against the collar $f$, on the axis $a$.

The shaft $a$ and pinion $b$ are thus frictionally connected together, and the rotation of the one is transmitted to the other. Each disk of the double series has the same amount of compression as if it were the first and only one interposed between the boss $e^2$ of the hand-wheel $e$ and the collar $f$. The frictional connection between the shaft $a$ and pinion $b$, caused by the pressure of the hand-wheel $e$ upon the double series of disks, increases in the same ratio as the number of disks employed: thus, with five pairs of disks, the friction from the pressure of the hand-wheel $e$, is multiplied tenfold, or nearly so; with six pairs, twelve times, and so on.

The frictional resistance to independent motion between the two bodies frictionally connected, as in the case of the shaft and pinion represented, may be increased at pleasure, by adding to the number of disks, or by increasing their diameter, so that where there is little diametrical space, or a limited longitudinal space for a shaft, this frictional coupling may be suited to either case by adding to the number of disks and reducing the diameter, or by adding to the diameter and reducing the number.

The materials of the disks must be varied according to circumstances. For ordinary pressures the series that rotate with the shaft may be of iron, and the other series of hard wood, elm being more commonly used. For very intense pressures, both series may be of iron, and one of them wholly or partly faced with wood, or one series may be made of iron and the other of another metal, such as gun-metal or copper. A pulley, or other rotating part of a machine, may be substituted for the pinion $b$, and instead of the bars $c$, a barrel may be made with projections or ribs, to engage with the disks, in the same manner as the bars.

Instead of applying pressure to the coupling and brake by the screwed hand-wheel, the pressure may be applied directly from the forked end of a lever pressing immediately upon the disks, in the manner commonly used in frictional cone-couplings.

Figures 6, 7, and 8 represent another form of my invention, applied as a coupling for revolving shafts; fig. 6 being a longitudinal vertical section, representing the coupling in action, and figs. 7 and 8 transverse sections of the same through the lines E, F, G, H, respectively.

$a$ is the shaft, to which is secured, by a key, $b$, the hollow cylinder $c$, shown in transverse section in fig. 7. $d$ is another shaft, the square part of which is shown in section in fig. 7. The said shaft $d$ has a bearing or journal in the nut $e$, and another bearing at its end in the cylinder $c$ at $i$. The nut $e$ is screwed on its exterior to fit or engage with a corresponding screw cut in the cylinder $c$. $ff$ are angular disks, shown in elevation in fig. 8. $gg$ are circular disks, the outline of which is shown in the section, fig. 7. $h$ is a wooden disk, to give elasticity to the pressure applied by the screw-nut $e$. The series of hexagonal disks $f$ have circular openings in them, as shown in fig. 8, in which the shaft $d$ may rotate freely, and the said disks $f$ are rather smaller in diameter than the interior of the cylinder in which they are situated, so that they may move longitudinally therein, but are prevented from rotating by their angular figure. The series of circular disks $gg$ have square openings fitting loosely the shaft $d$, which prevent them rotating on it, but allow them to move longitudinally. The outline of the disks $gg$ is circular, allowing them to rotate within the hexagonal cylinder $c$ when required.

The action of the coupling is as follows: The nut $e$ being withdrawn, so that it exerts no pressure upon the disks $f$, against which its inner end bears, the shaft $d$, with its series of disks $g$, may rotate in its bearings without giving motion to the shaft $a$. In like manner, the shaft $a$ may rotate with its series of disks $f$, without giving motion to the shaft $d$. To establish frictional connection between the two shafts, $a$ and $d$, the nut $e$ is screwed inwards, compressing all the disks of both series together, and compressing them between the said nut $e$ and the inner end of the cylinder $c$. Thus one of these shafts may be made to drive or rotate the other with a degree of force regulated by the pressure of the nut $e$. The frictional connection of the two shafts produced by the pressure of the nut $e$ upon the disks may be increased to any degree by adding to the number of disks. Frictional coupling for shafting may thus be obtained of small diameter to transmit any amount of power suited to the shaft, and which may be controlled by a single screw-nut.

Figures 9, 10, and 11, represent a coupling, constructed according to my invention, for connecting or disconnecting shafts when in motion. Fig. 9 is a longitudinal section, representing the coupling in action. Fig. 10 is a transverse section, and fig. 11, a section of one of the disks.

$a$ and $d$ are shafts. $c$ is a hollow cylinder, secured by the key $b$ to the shaft $a$. The said cylinder $c$ has a groove cut lengthwise in its interior, into which the tongues or projections upon the disks $f$ enter, as shown in figs. 9 and 10. $j$ is a collar, screwed and pinned upon the end of the shaft $d$, its exterior having a bearing in the cylinder $c$. Lengthwise upon the shaft $d$ a groove, $d^2$, is made, into which the tongues or projections of the disks $gg$ enter, as will be understood by an examination of figs. 10 and 11. The outer disk $g'$ of the series $gg$, is made much larger in diameter than the others, to wholly close the outer end of the cylinder $c$, as shown in fig. 9. $k$ is a hollow shaft, with a feather or projection, $l$, extending into the groove $d^2$ in the shaft $d$, the said feather or projection, $l$, being similar in section to the projections upon the disks $g$ which enter the same groove $d^2$. On the exterior of the hollow shaft $k$ a screw is cut, and a corresponding screw is made in the centre of the hand-wheel $e$. The hollow shaft $k$ abuts against the boss or centre of the hand-wheel $n$. Upon the shaft $d$ a screw, $m$, is cut, and a corresponding screw is made in the centre of the hand-wheel $n$.

The two series of disks, $f$ and $g$, are arranged alternately with each other, as hereinbefore explained. The hand-wheel $e$ being screwed backwards towards the hand-wheel $n$, so that no pressure is exerted through the disk $g'$, upon the series of disks, the shaft $d$, as well as the two hand-wheels $e$ and $n$, disk $g'$, and the disks $g$, will be at rest, while the shaft $a$ revolves, carrying with it the cylinder $c$ and disks $f$. If the rotation of the shaft $a$ be in the direction of the arrow, the screw upon which the hand-wheel $n$ traverses being a right-handed one, the said hand-wheel $n$ is screwed up, pushing before it, towards the shaft $a$, the hollow shaft $k$ and hand-wheel $e$, until it receives, together with the disks $g$, shaft $d$, and hand-wheel $e$, the rotatory motion of the shaft $a$, and, after this motion is transmitted from the shaft $a$ to the shaft $d$, the frictional connection between the said shafts $a$ and $d$ may be increased by checking the rotation of the hand-wheel $n$, the rotation of the said hand-wheel being in the direction of the arrow, and the screw, upon which the said hand-wheel traverses, a right-handed one. Should the velocity be too great to allow of checking the speed of the hand-wheel $n$ by grasping it with the hand, other means must be adopted, as, for example, a simple wooden lever pressed against its periphery.

To disconnect the two shafts $a$ and $d$, when rotating as shown, it is only required to check the motion of the hand-wheel $e$, which traverses upon the left-handed screw of the hollow shaft $k$. When the coupling is in action, all the parts may have the positions shown in fig. 9.

If the driving-shaft rotates in a contrary direction to that indicated by the arrow, the shafts $a$ and $d$ are connected together by using the hand-wheel $e$, and disconnected from each other by using the hand-wheel $n$. By giving the disks $f$ and $g$ the sectional figure represented in fig. 9, they are stronger, and have a better bearing against the hollow cylinder $c$ and shaft $d$, respectively, than they would have were their sides parallel, and maintain more accurately a position at right angles to their common axis.

Figure 12 represents in vertical longitudinal section a brake, constructed according to my invention, applied to a hoisting-machine.

$a$ is a pinion-shaft, on which the pinion $b$ is keyed. Winches or cranks are applied to the square ends of the shaft $a$. On the angular part, $a^2$, of the shaft $a$ is a series of disks, $c\ c$, rotating with the shaft $a$, and capable of sliding upon it. $d\ d$ are disks alternating with the disks $c\ c$, the said disks $d\ d$ being hexagonal, and capable of sliding in the hexagonal box $e$, but capable of rotation. The box $e$ is fixed to the frame $f$ of the hoist. $g$ is a screw worked by the hand-wheel $h$, the said screw $g$ engaging with the hollow screw in the circular end of the hexagonal box $e$. By means of the hand-wheel $h$ the screw $g$ may be made to advance into and may be withdrawn from the end of the box $e$, and the two series of disks, $c\ c$ and $d\ d$, compressed together, so as to arrest the motion of the shaft $a$, or liberate it, so as not to impede the motion of the said shaft $a$.

Figure 13 represents in section, and Figure 14 in elevation, a modification of my invention, which has for its object to prevent the communication of undue strains in toothed gearing.

$a$ is the angular driving-shaft carrying the disks $b$, which slide upon it, but cannot rotate independently of it. $c\ c$ are a series of disks alternating with the disks $b\ b$. The said disks $c$ are much larger in diameter than the disks $b$, and are so formed that when compressed together they constitute a pinion or toothed wheel, as represented in fig. 14. By means of the screw $d$, on the shaft $a$, and the screw-nut $e$, upon the screw $d$, the disks $b$ and $c$ may be compressed together with such force that the toothed wheel or pinion formed by the disks $c$ may yield, and not be carried round by the shaft $a$ when the resistance to the motion of the toothed wheel $c$ exceeds that to which the apparatus is adjusted.

Figure 15 represents in elevation an arrangement exactly similar to that represented in figs. 13 and 14, excepting that instead of the disks $c$ being formed into a toothed wheel, they are formed into a ratchet-wheel.

Having now described the nature of my invention, and the manner in which the same is to be performed, I wish it to be understood that I do not limit myself to the precise details herein described, and illustrated in the drawings, as the same may be varied without departing from the nature of my invention; but

I claim as my invention—

A new or improved coupling and brake for transmitting or regulating or arresting motion, the parts of which are arranged or combined substantially in the manner hereinbefore described, and illustrated in the accompanying drawings.

THOMAS ALDRIDGE WESTON. [L. S.]

Witnesses:
RICHARD SKERRETT,
EDWARD ROWLAND.